Feb. 18, 1941.  D. ROBERTS ET AL  2,231,950
METHOD OF MANUFACTURING CLOSED CELL EXPANDED RUBBER WITHOUT PRECURE
Filed Aug. 24, 1937
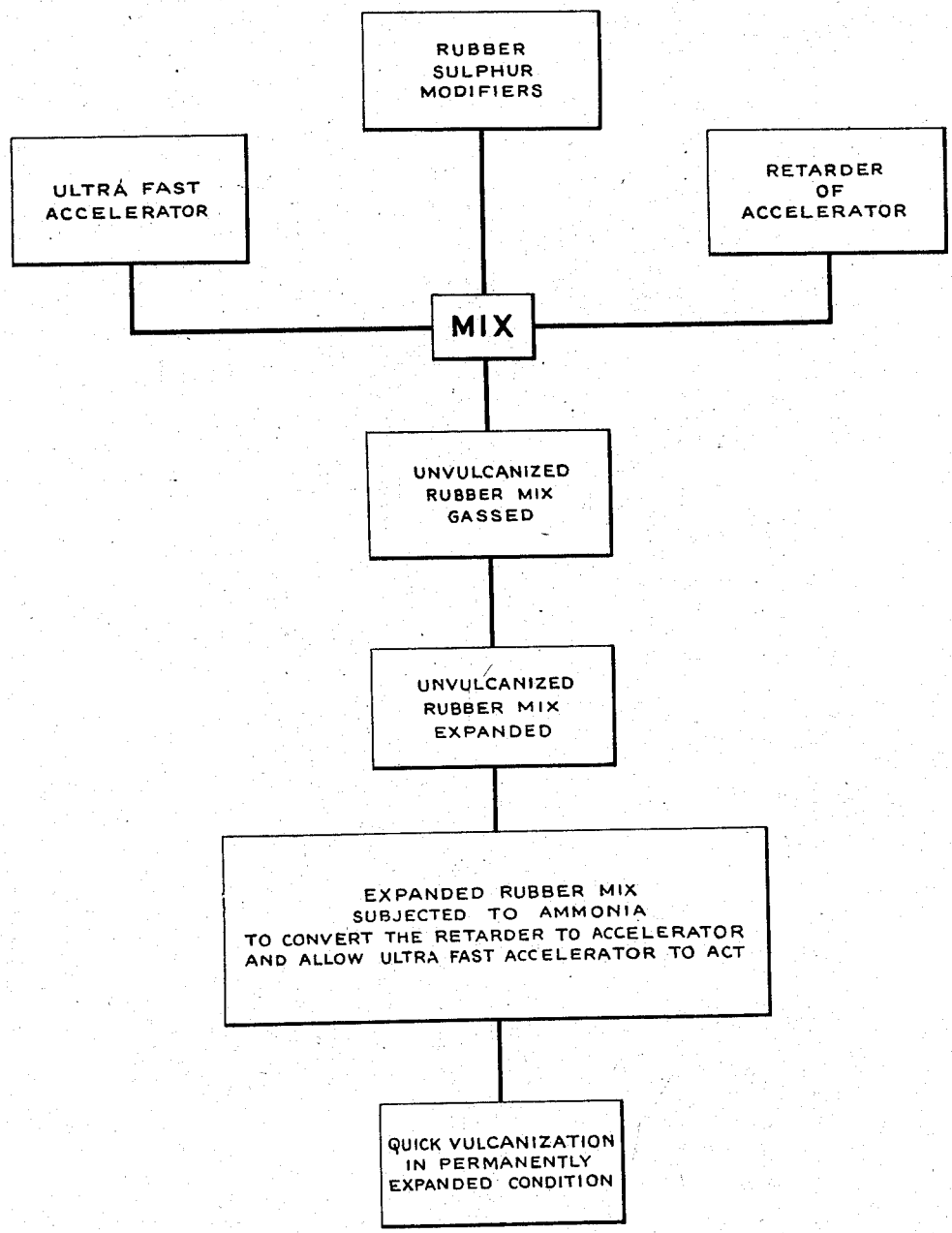
INVENTORS
Dudley Roberts
Roger Charles Bascom
BY
Samuel Ostrolenk
ATTORNEY.

Patented Feb. 18, 1941

2,231,950

UNITED STATES PATENT OFFICE 2,231,950

METHOD OF MANUFACTURING CLOSED CELL EXPANDED RUBBER WITHOUT PRE-CURE

Dudley Roberts, New York, and Roger Charles Bascom, Merrick, N. Y., assignors to Rubatex Products, Inc., New York, N. Y., a corporation of Delaware Application August 24, 1937, Serial No. 160,574

3 Claims. (Cl. 260—725)

This invention relates to a method of making gas expanded rubber and rubber-like plastic characterized by closed cell structure, and more specifically to a method of gassing unvulcanized rubber with a gas, expanding the rubber and quick setting the expanded rubber in a vulcanized condition.

In the past, gas expanded rubber of closed cell structure has been made in different ways. It has been proposed to partially vulcanize a suitable rubber mixture before subjecting it to the influence of externally applied gas in order to give to the rubber a certain preliminary cure or set to retain therein the injected gas. This preliminary cure has caused certain difficulties such as the prevention of a suitable expansion because the rubber has already reached a more or less set stage and has therefore lost plasticity. This step of pre-vulcanizing the rubber mix before subjecting it to gas also necessitated more expensive apparatus since suitable heating chambers had to be provided.

Another method of manufacturing gas expanded cell tight rubber involved the use of hot gas in the gassing of the uncured rubber. The hot gas not only impregnated the rubber with the gas but caused the same partial cure or vulcanization involved in the process hereinbefore mentioned. This method is undesirable because of the lack of uniformity. More specifically, when the hot gas method is used the external portions of the rubber mix are given a greater cure and the internal portions are given little or no cure, a non-uniform product resulting. Again a greater expense is involved since the gas must be heated. With respect to the use of a hot gas, it is to be noted that when gas is heated it occupies, by reason of the physical laws involved, a greater volume than a corresponding amount of cold gas. That is, for a given volume of hot gas introduced, less actual gas is in the rubber than if an equal volume of cold gas had been introduced. This is of importance when the gas and structure are ultimately cooled since the gas must support the cell walls.

My invention is concerned with the elimination of these difficulties. I form a suitable rubber mix according to a method to be set out hereinafter and I subject this unvulcanized rubber mix as formed to the action of a gas at room temperature. In this state a gas thoroughly permeates the rubber and is incorporated therein under pressure. When the desired amount of gas has been forced into the rubber, the pressure is released and the rubber allowed to expand under the influence of the gas contained therein. This expansion is effected by the equilibrium that is set up in pressures between the gas inside the rubber and the atmosphere surrounding the rubber. There is a normal tendency for such contained gas to establish this equilibrium in pressures. The rubber being in an unvulcanized state can expand fully without hindrance from stiffness of the rubber mass. When the desired expansion has been reached, the rubber is subjected to influences which cause a very rapid vulcanization. The quick vulcanization can be effected by the use of a retarder in the original mix which is converted into an accelerator of vulcanization at the point of vulcanization by the use of a gaseous agent.

The quick vulcanization effects the permanent cure of the rubber before the plastic stage is reached so that the expanded structure of the rubber is not disturbed. The vital points of difference in my method over that of the prior art resides in:

1. The use of a gas at room temperature for the gassing operation.
2. The absence of heat until after full expansion has taken place and vulcanization is effected.
3. The elimination of heat treatment in or before the autoclave and gassing operation.
4. The use of retarders which are convertible to accelerators to effect extremely fast vulcanization.

My process eliminates waste materials formerly inevitable in this expansion operation. Since there is no heat used until the final stage of vulcanization, there is no waste of vulcanized rubber produced. Any waste that results is unvulcanized and can be thrown right back into a rubber mix without loss. The vulcanized rubber scraps of waste material which represented such a large loss in the prior operations in this art have been eliminated.

An object of my invention is to provide a novel process for the manufacture of gas expanded closed cell rubber in which unvulcanized rubber is gassed and subjected to a quick vulcanization to hold the closed cells of gas intact.

Another object of my invention is to provide a simplified process for the manufacture of gas expanded rubber wherein vulcanization is carried on in only one stage.

Another object of my invention is to provide a process for manufacturing gas expanded rubber which involves no waste materials.

Another object of my invention is to provide a process for the manufacture of gas expanded closed cell rubber in which no heat is employed before or during the gassing and expanding operations.

Another object of my invention is to eliminate or minimize the plastic stage during the expansion and vulcanization of the rubber mix.

As a specific illustration of my invention, I take a composition such as one of the following:

I

| | Parts |
|---|---|
| Rubber | 100 |
| Sulphur | 2.5 |
| Zinc oxide | 1 |
| Accelerator 552* | 0.5 |
| Furfural | 3 |

*Accelerator 552 is piperidinium-pentamethylene-dithiocarbamate.

II

| | |
|---|---|
| Rubber | 100 |
| Sulphur | 50 |
| Accelerator 552* | 0.5 |
| Furfural | 3 |

*Accelerator 552 is piperidinium-pentamethylene-dithiocarbamate.

The first composition outlined above results in the production of soft rubber and the second composition listed above, results in the formation of hard gas expanded rubber. Suitable modifying agents may be added for fillers, colors and other desirable properties.

Accelerator 552 is one of the ultra fast accelerators of vulcanization. Furfural is employed in conjunction with it in order to retard its action until after the mixing and calendering is completed. When vulcanization is desired the rubber mix is saturated with ammonia gas which reacts with the furfural to form an accelerator which in turn acts with the accelerator 552 and ammonia present to cause rapid vulcanization.

The rubber is first thoroughly broken down and masticated for a sufficient period to make it reasonably plastic (approximately 1 hour for 100 pounds on a 60" mill), and to the masticated rubber is added the furfural and sulphur in the proportions above indicated. After the furfural and sulphur are incorporated and blended with the rubber, the accelerator 552 and the other compounding ingredients are added and well blended with the rubber on the mixing rolls. After the ingredients are incorporated in the rubber, the mix is allowed to cool and rest for a suitable period of time in order to avoid precure and to rearrange the molecular structure of the rubber. The violent working on the rolls has a tendency to affect the properties of the rubber due to disturbance of the molecular structure of the rubber. The rest period corrects this. The rubber dough, with the above ingredients uniformly distributed throughout, is suitably formed by means of a shaping device such as an extruder or calender. After the shaping process, the rubber is again allowed to rest in order to dissipate any heat which has developed in the mix during this shaping step and also to allow the molecular structure of the rubber to rearrange itself so as to properly restore those valuable properties such as elasticity which are inherent in the rubber mass.

The shaped rubber, which is completely unvulcanized, is then subjected to the action of inert gas such as nitrogen. The gas may be applied in either of two well-known methods, as for instance, the external application of gas such as nitrogen under pressure of 4,000 pounds per square inch, or in the instance of making a hard gas expanded product $CO_2$ may be used at a pressure of the order of 1,000 pounds per square inch. Alternative to the external application of gas, suitable chemicals may be introduced to the rubber mass during the mixing process which are adapted to react or to decompose under the influence of heat to evolve a gas within the rubber.

After the rubber is thoroughly permeated with gas and while still in an unvulcanized condition, it is permitted to expand completely. As soon as the rubber has reached the desired state of expansion, it is thoroughly permeated with anhydrous ammonia gas under a pressure of less than 5 pounds per square inch or suitable mixture of ammonia with an inert gas such as air, for a period of an hour to allow complete penetration of the ammonia mix throughout the rubber. The temperature of the rubber mass and the ammonia gas, is then raised to approximately vulcanizing temperature (212° F.) for a sufficient period to insure vulcanization. This vulcanization may be partial in a sense that the rubber is given sufficient set to enable it to hold the contained gas, and the shaped, partially vulcanized, expanded rubber mass can then be placed in suitable molds for the final vulcanization step. Alternative to this vulcanization process, the expanded rubber can be given a complete vulcanization in one stage. It is to be noted that the operativeness of this process depends primarily on the fact that the vulcanization is effected so quickly that the closed cell structure within the rubber is retained. This rapid vulcanization can be effected only by the use of an ultrafast accelerator which can be activated by a subsequent agent that thoroughly permeates the rubber. In this instance, I use ammonia gas. If a normal accelerator with the customary speed, or any accelerator that is possible to incorporate in the rubber mass during the milling stage, were used it would be impossible to obtain the desired quick vulcanization since an accelerator that would effect a rapid enough vulcanization would cause premature vulcanization of the rubber mass during the incorporation of the accelerator on the mixing mill. An accelerator which is less fast than that which is set forth in this process would result in the formation of an open cell structure since it would not set the expanded rubber sufficiently fast to retain the gas enclosed in sealed cells.

Our process as set forth provides a simplified method of manufacturing gas expanded closed cell rubber with the maximum expansion. The elimination of the pre-vulcanization also effects a great economy in the hitherto costly method of producing gas expanded closed cell rubber.

It is a primary consideration of our method to obtain a closed cell gas expanded rubber in contrast to an open cell sponge rubber. We can obtain a closed cell rubber only by using an ultra accelerator such as 552. An ultra accelerator is one which is effective below 200 degrees F. A relatively slow accelerator such as Captax which is mercaptobenzothiazole could not be successfully employed to produce the closed cell structure which we desire since it would not vulcanize fast enough to retain the closed cell structure. Captax would produce an open celled or sponge rubber.

An ultra accelerator would ordinarily be set off during the milling operation. The ultra accelerator which we employ can be used only in conjunction with retarders which are subsequently neutralized by the action of ammonia gas to permit the accelerator to act.

We have used these means of acceleration:
(1) An ultra fast accelerator with retarders subsequently neutralized.
(2) Accelerator 552 and an aldehyde subsequently converted by ammonia.
(3) A normal accelerator subsequently activated by ammonia (ammonia is an accelerator of itself).
(4) A normal accelerator and an aldehyde subsequently subjected to the action of ammonia gas.

Rubber in its unvulcanized state is a thermoplastic material with a certain amount of tensile strength. When the rubber is subjected to heat it becomes more plastic and its tensile strength falls off. When, however, the necessary vulcanizing agents are present and a vulcanizing temperature is reached, the tensile strength rapidly rises as the rubber enters a vulcanized condition.

It has been found that in the art of manufacture of closed cell gas expanded rubber that the gas could not be retained within the rubber unless the rubber was given a partial cure or vulcanization to give sufficient stiffness so as to prevent the gas from escaping from the semi-plastic mass. The disadvantages of this precure or prevulcanization are manifold and are set forth herein. We have found that we can impart to the rubber a gas and maintain it therein by the employment of ultra-fast accelerators and by the control of the plastic nature of the rubber so that this drop in the tensile strength that ordinarily takes place upon heat treatment and which ordinarily would tend to discharge the gas contained in the rubber is eliminated. The condition of the rubber is transferred from the thermoplastic mass with sufficient tensile strength to hold the gas, to a vulcanized state with more than enough tensile strength to hold the gas, in such a short time that the plastic stage of very low tensile strength is either eliminated entirely or rendered so short as not to permit the escape of the gas. This is the basic theory that underlies the method we have set forth.

The above described process is shown in form of flow sheet in the accompanying drawing.

I claim:
1. A method of forming closed cell gas expanded rubber which comprises forming a rubber mix comprising rubber, an ultra fast accelerator, and a retarder to prevent the accelerator from acting; gassing the rubber mix with an unheated nitrogen gas; removing the gas pressure; allowing the gassed mix to expand without heat to form a closed cell gas expanded structure and subjecting the mix to ammonia gas to convert the retarder to an accelerator and cause rapid vulcanization throughout the mix to prevent the rubber from losing its closed cell structure.

2. A method of forming closed cell gas expanded rubber which comprises forming a rubber mix comprising rubber, an ultra fast accelerator, and an aldehyde retarder to prevent the accelerator from acting; gassing the mix with an unheated gas; removing the gas pressure; allowing the mix to expand without heat to form a closed cell expanded structure and subjecting the mix to ammonia to convert the aldehyde retarder to an accelerator and cause rapid vulcanization to prevent the rubber from losing its closed cell structure.

3. A method of forming closed cell gas expanded rubber which comprises forming a rubber mix comprising rubber, an ultra fast accelerator, and an aldehyde retarder to prevent the accelerator from acting; gassing the mix with a gas at room temperature; removing the gas pressure; allowing the mix to expand to form a closed cell expanded structure; subjecting the mix to ammonia gas to convert the aldehyde retarder to an accelerator and cause rapid vulcanization throughout the mix to prevent the rubber from losing its closed cell structure.

DUDLEY ROBERTS.
ROGER CHARLES BASCOM.